United States Patent [19]

Ebel et al.

[11] 4,120,826

[45] Oct. 17, 1978

[54] HYDRODESULFURIZATION CATALYSTS BASED ON SUPPORTS PREPARED FROM REHYDRATABLE ALUMINA

[75] Inventors: Robert H. Ebel; Donald P. Spitzer, both of Riverside; William Edward Bambrick, Old Greenwich, all of Conn.

[73] Assignee: American Cyanamid Company, Stamford, Conn.

[21] Appl. No.: 696,092

[22] Filed: Jun. 14, 1976

[51] Int. Cl.[2] .................... B01J 21/04; B01J 23/84; B01J 23/88

[52] U.S. Cl. .................................................. 252/465

[58] Field of Search ............... 252/463, 465; 423/628

[56] References Cited

U.S. PATENT DOCUMENTS

| | | | |
|---|---|---|---|
| 2,881,051 | 4/1959 | Pingard | 423/628 |
| 3,213,040 | 10/1965 | Pedigo et al. | 252/465 |
| 3,223,483 | 12/1965 | Osment | 252/463 X |
| 3,374,270 | 3/1968 | Hausen et al. | 252/463 X |
| 3,645,914 | 2/1972 | Rosinski et al. | 252/463 X |
| 3,663,457 | 5/1972 | Tamura et al. | 252/463 |
| 3,714,313 | 1/1973 | Beiding et al. | 252/463 X |
| 3,873,470 | 3/1975 | Conway et al. | 252/465 |

FOREIGN PATENT DOCUMENTS 820,536 9/1959 United Kingdom .................. 252/465

Primary Examiner—W. J. Shine
Attorney, Agent, or Firm—Robert J. Feltovic; Gordon L. Hart

[57] ABSTRACT

Disclosed is a method for producing a hydrodesulfurization catalyst and the catalyst produced thereby. The HDS catalyst is prepared by solution impregnation of an alumina catalyst support which has been made from a rehydratable form of alumina.

12 Claims, No Drawings

HYDRODESULFURIZATION CATALYSTS BASED ON SUPPORTS PREPARED FROM REHYDRATABLE ALUMINA

The invention relates to the preparation of catalysts suitable for use in the hydrotreating of petroleum fractions. In particular, it relates to the preparation of improved catalysts containing oxides of nickel, cobalt and molybdenum. More particularly, it relates to catalysts for hydrodesulfurization, denitrification and aromatics saturation based on an alumina support prepared from a rehydratable form of alumina.

As is known in the petroleum refining industry, methods of hydrotreating to effect desulfurization, nitrogen removal and saturation of aromatics are widely practiced in order to improve petroleum stocks. Catalysts which have been used in such hydrotreating applications commonly include promoters such as oxides of cobalt, nickel, molybdenum and tungsten. These catalysts are supported on a high surface area base such as activated alumina.

A wide variety of hydrotreating catalysts are now in commercial use in which an activating metal or metal oxide is supported on or impregnated throughout an alumina base. Alumina of suitable structure and physical properties can be prepared from a variety of known processes. For example, such a catalyst base can be prepared by hydrolyzing an aluminum-alcoholate. The aluminum-alcoholate can be made by reacting aluminum metal with a high boiling, partially miscible alcohol, such as amyl alcohol, using mercuric chloride as a catalyst. The aluminum-alcoholate thus formed can then be hydrolyzed to an aluminum hydroxide from which water can be removed to produce a high surface area alumina. Suitable alumina also can be prepared from bauxite ore concentrate (BOC) by dissolving separate portions of BOC in acid or caustic solutions, and then mixing the two solutions to form clusters of precipitated alumina (PA). These clusters can be filtered, washed and spray-dried into microspheres of precipitated alumina powder. This powder then can be moistened and shaped to desired form.

Alumina bases prepared by these and other methods have proven to be suitable supports for hydrotreating catalysts and are commercially available and accepted. However, the physical and chemical properties which active aluminas possess are strongly dependent on the procedures followed in their preparation. Consequently, the active alumina art is highly developed and replete with disclosures for various manufacturing methods for optimizing certain characteristics of active alumina to meet the demands of particular applications. In addition though, with steadily escalating raw material costs, methods are desirable which not only improve product properties but also minimize production expense.

Accordingly, it is the object of this invention to provide a method for producing hydrotreating catalysts which reduces expenses of, simplifies production of and results in a catalyst product exhibiting good activity, with minimum of activating metal required.

DESCRIPTION OF A PREFERRED EMBODIMENT

According to a preferred method for producing alumina supports for hydrotreating catalysts of the present invention, hydrated alumina, such as is generally produced from bauxite ore using the Bayer process, is initially flash calcined to produce a partially dehydrated, rehydratable product consisting of anhydrous alumina, lower hydrate forms of alumina, alumina monohydrate, and unreacted trihydrate. The rehydratable alumina which can be used in the present process may vary in composition. The powder commonly can be characterized by its LOI (loss on ignition) and its RI (rehydration index). The LOI is determined by measurement of the amount of weight loss on heating the alumina powder at 1800° F. for 2 hours. The RI, which denotes the amount of rehydratable alumina present in the powder, is computed according to the formula:

$$RI = \left[ \frac{(LOI \text{ after rehydration} - LOI \text{ before rehydration})}{15 \, (100 - LOI \text{ after rehydration})} \right] 3700$$

In general, the preparation method for the rehydratable alumina consists of partially dehydrating alumina trihydrate by passing it through a flow of high temperature gas for a fraction of a second to several seconds. The composition of the resulting product varies according to the trihydrate feed rate, the particle size, the gas temperature, and the residence time of the particle in the gas stream. This rehydratable powder composition can be milled or ground to reduce the particle size and then mixed with water and formed into beads, pellets or extrudates as desired. The formed alumina may be hardened or cured to increase crush strength. Steam treatment curing has been found to be preferable. The alumina forms are then dried and calcined. Calcining temperatures usually range from 800° F. to 1300° F.

This alumina catalyst base material is then treated by a pore impregnation method in order to incorporate the catalytic promoters. The catalytic promoters for HDS catalysts generally are selected from Group VIII or Group VI Metal oxides or sulfides, such as CoO, NiO and $MoO_3$. The preferred weight percentages of these promoters on the catalysts have been found to be in the ranges: CoO and/or NiO (2–6%) and $MoO_3$ (6–24). Minor amounts of other materials such as (0–3%) of P and/or silica may also be included. In the preferred method, the pore volume of the alumina forms first is determined and active metals are incorporated as soluble salts dissolved in an amount of solution just sufficient to fill the alumina pore volume.

Various known methods of forming shaped alumina bodies may be utilized, such as beading or extruding. Extrudates appear, in many cases, to be the preferred form for HDS catalyst supports. Manufacture of extrudates, unfortunately, is complicated by the fact that it has been noted in working with rehydratable alumina compositions that such alumina powders often can be processed only with difficulty to form extrudates using known extrusion techniques. Hence, preparation of alumina extrudates from rehydratable alumina compositions is not as straightforward as precipitated alumina (PA). PA is processed into extrudates simply by mulling it with water and extruding. This procedure often fails with rehydratable alumina compositions because of the rehydration reaction between the alumina and water which results in a rehydrated cementitious mass that can bind the extruder screw within its barrel and prevent extrusion.

Soda impurities are inherently present in alumina from the Bayer process which involves precipitation of aluminum hydrate from sodium aluminate solutions.

Hence, an additional problem when working with rehydratable alumina is its characteristically high soda ($Na_2O$) content (about 0.2–0.5%). This amount of soda is undesirable for HDS applications. Accordingly, a washing or soda removal procedure must be incorporated somewhere in the processing scheme in order to reduce soda content to an acceptable level.

Accordingly, a processing method has been developed to compensate for the above-recited problems. It has been discovered that rehydration of the rehydratable alumina powder before extrusion stabilizes the alumina so as to permit mulling and extrusion without cementitious formation. Several alternative rehydration procedures may be employed. The rehydratable alumina may, for example, be acid rehydrated by heating the alumina powder in water at about 100° C. for several hours with about 4–5% $HNO_3$ based on the weight of the alumina. Afterwards, this slurry can be filtered, washed and spray dried prior to mulling and extruding. Another, more advantageous procedure is to acid-rehydrate the alumina at high solids levels, so that the mix can afterwards be mulled and extruded directly.

It is hypothesized that acid rehydration accomplishes partial rehydration of the rehydratable alumina to a stable monohydrate form which does not rehydrate further under the muller and extrusion conditions. Although the use of nitric acid has proven to be successful, other acids may be readily substituted, e.g. $H_3PO_4$, $H_2SO_4$, $H_2CO_3$. It has been found through experimentation that operation of the rehydration step below pH 7 is preferred since it results in the formation of monohydrate which produces a product of higher surface area and micropore volume and consequently a final catalyst of higher HDS activity. Rehydration at pH above 7 results in formation of a mixture of mono- and trihydrates, not primarily monohydrate.

A particularly advantageous procedure has been found to be the use of carbonic acid for rehydration. In this procedure, the aqueous slurry of rehydratable alumina is contacted with $CO_2$ to reduce the pH. The relatively weak carbonic acid has been found adequate to repress trihydrate formation during rehydration and to remove soda impurities. During the high temperature calcining in catalyst preparation, the carbonate residues formed are discharged to the atmosphere with minimal pollution problems.

A further rehydration processing variation is based on the observation that rehydratable alumina slurries at ambient temperature can be readily filtered to form a high solids (about 50–55%) filter cake. Accordingly, rehydratable alumina can be slurried at ambient temperature (preferably to about 10–20% solids) neutralized with acid, filtered and washed. Soda thus is reduced to less than 0.03%. The filter cake is heated to produce rehydration of the alumina, then is mulled and extruded.

The high solids rehydration processes involve heating a high solids slurry, during which the slurry mix is transformed from a fluid to a solid cake. Accordingly, it becomes necessary to crush the cake prior to mulling. An alternative to avoid this additional handling is to rehydrate in a heated mixer which yields a granular product directly suitable for mulling or extrusion.

In a variation to the above method of processing, it has been found that treatment of a rehydratable alumina slurry (preferably about 20% solids) with $CO_2$ with application of heat and pressure provided a slurry which could be filtered to yield a low $Na_2O$, high solids filter cake suitable for direct mulling or extrusion. Preferable temperature and pressure has been found to be about 65° C. and about 100 psig.

After preparation of the shaped alumina supports as discussed above, the catalysts are prepared by impregnation of the alumina supports with solutions of active metals. The pore volume of the alumina bodies can be determined by titration. Soluble salts of cobalt (and/or nickel), molybdenum (and/or tungsten) and phosphorus are dissolved in water to make just sufficient solution to fill the alumina pores. This solution and the alumina bodies are mixed and preferably held for about 0–4 hours and then dried and calcined. The Co(Ni) and Mo(W) salt solutions can be impregnated into the alumina in separate steps, or, alternatively, a solution containing two or more salts can be prepared if a suitable stabilizing agent is added. These stabilizing agents may include $H_3PO_4$, $NH_3$, or various polybasic organic acids such as citric or tartaric acids.

The following examples demonstrate preparation of HDS catalysts using the method of the present invention. They are not intended to be limiting but merely illustrative.

Extrudate Preparation from a Rehydratable Alumina

EXAMPLE 1

400 grams of a rehydratable alumina powder (RI 50) was added over a period of 5 minutes to an 85° C. acid solution of 20 grams of nitric acid in 3 liters of water. The temperature of this alumina - acid mixture then was held between 90° and 100° C. for 2 hours. The pH at the end of this time was 5.3. 18 Ml of 29% $NH_3$ then was added to raise the pH to 7.3. The alumina was separated by filtration, washed, reslurried, and spray-dried. 200 grams of the spray-dried powder was mulled with 120 grams of water and 2 grams $NH_3$ for 30 minutes and then extruded. The extrudates were dried at 250° F. for 30 minutes and then calcined at 1200° F. for 1 hour. The resulting product was determined to have a pore volume of 0.68 ml/gm.

EXAMPLE 2

600 gm of a rehydratable alumina powder (RI 50), 500 gm $H_2O$ and 25 gm $HNO_3$ were mixed together to form a slurry. This slurry was heated in a closed container at 80°–90° C. for 1 hour. The resulting hardened mix was mulled for 30 minutes with 35 ml of 29% $NH_3$. The muller mix was then extruded and the shaped extrudates were dried at 250° F. and calcined at 1200° F. The calcined extrudates were washed with 10 to 20 times their weight in water for about 1 hour and then dried and calcined at 1000° F. The resulting product was determined to have a pore volume of 0.69 ml/gm.

EXAMPLE 3

600 gm of a rehydratable alumina powder (RI 51) was mixed with 490 gm $H_2O$ at room temperature. The slurry pH decreased from approximately 9 to approximately 7 by adding nitric acid (approximately 1% of the weight of the alumina). The slurry was filtered and the filter cake was washed. The filter cake contained 50–55% $Al_2O_3$. This filter cake was heated (80°–90° C.) for approximately 1 hr. in a closed container to produce rehydration, then mulled and extruded. The extrudates were dried and calcined as above. The resulting pore volume was 0.78 ml/gm.

HDS Catalyst Preparation

EXAMPLE 4

A rehydratable alumina extrudate was prepared, according to Example 1, having a pore volume of 0.68 ml/gm. An 89 gm sample of this extrudate was determined to have a total pore volume of 60.6 ml. A catalyst metal solution was then prepared containing 16.8 gm Co nitrite (2.5 gm CoO), 1.9 gm 85% $H_3PO_4$ (0.5 gm P). To this solution was added 8.0 gm $MoO_3$, dissolved in an equimolar amount of $NH_3$ to a volume of 32 ml. The solution was diluted to a total volume of 60.6 ml (equivalent to the total pore volume of the alumina extrudates). The formed alumina and metals solution were mixed and held in a closed container for 30 minutes. The impregnated extrudates were then dried at 250° F. for 30 minutes, and calcined at 1000° F. for 1 hour. The composition of the finished catalyst was calculated to be 89% $Al_2O_3$, 2.5% CoO, 8% $MoO_3$, 0.5% P (by weight).

EXAMPLE 5

A rehydratable alumina extrudate was prepared having a pore volume of 0.76 ml/gm. A catalyst metal solution was then prepared containing 37.3 gm Co nitrate solution, (4.0 gm CoO) mixed with 3.0 gm 85% $H_3PO_4$ (0.8 gm P). To this was added 12 gm $MoO_3$ dissolved in an equimolar amount of $NH_3$ (4.8 ml of 29% $NH_3$) to a total volume of 36 ml. 83.2 grams of the alumina extrudates (total pore volume 65 ml) was mixed with the solution after diluting the solution to a total of 65 ml. The mixture was held for 45 min., then dried at 250° F. for 1 hr. and calcined at 1000° F. for 1 hr. Composition of the finished catalyst was: 4% CoO, 12% $MoO_3$, 0.8% P, 83.2% $Al_2O_3$.

EXAMPLE 6

A rehydratable alumina extrudate was prepared according to Example 3, which had a pore volume of 0.78 ml/gm. An 84 gm sample of extrudate was measured (65.5 ml pore volume). A catalyst metal solution was made by dissolving 12.0 gm $moO_3$ in 4.8 ml 29% $NH_3$ to a volume of 48 ml. This solution was diluted to 65.5 ml and was mixed with the alumina extrudates. After being held for 30 minutes, the extrudates were dried at 250° F. and calcined at 1000° F. A second catalyst metal solution then was made by diluting a 37.3 gm Co nitrate solution (4.0 gm CoO) to a volume of 60 ml and mixed with the Mo-impregnated alumina extrudates. After 30 minutes, the extrudates were dried at 250° F. and calcined at 1000° F. The final catalyst composition was determined to be 4% CoO, 12% $MoO_3$, balance $Al_2O_3$ (by weight).

EXAMPLE 7

Beads made from a rehydratable alumina were prepared having a pore volume of 0.80 ml/gm. An 83.25 gm sample of these beads was taken; the total pore volume was calculated to be 66.6 ml. A catalyst metal solution was then prepared containing 12.0 gm $MoO_3$, 1.98 gm $CoCO_3$ and 2.37 gm $H_3PO_4$. To this mixture was added 50 ml of $H_2O$ and then the mixture was treated at 90°–100° C. for 3 hrs, until the solution was clear. After cooling the solution to room temperature, 13.5 gm cobalt nitrate solution (14.9 wt % CoO) was added. The solution was diluted to 66.6 ml (equivalent to the total pore volume of the alumina beads). The alumina beads and the catalyst solution were then mixed, held in a closed container for 30 minutes, dried at 250° F. for 30 minutes, and then finally calcined at 1000° F. for 1 hour. The composition of the finished catalyst was calculated to be 4% CoO, 12% $MoO_3$, 0.75% P, balance $Al_2O_3$ (by weight).

Catalyst Activity

The catalytic activity of the HDS catalysts prepared by solution impregnation of alumina supports made from rehydratable alumina compositions has been found to be quite favorable in comparison with commercial HDS catalysts.

HDS activity measurements have been made using a Batch Stirred Test Reactor (BSTR). In this test, a fixed amount of pre-sulfided (the mixture of Co and Mo oxides is converted to the corresponding sulfides by heating in a mixture of $H_2$ and $H_2S$) catalyst (10 gm) and a fixed amount of oil (300 gm) are put into a high pressure reaction chamber. The chamber is sealed and pressurized (500 lbs.) with $H_2$. With $H_2$ bubbling continuously through the oil at a rapid rate (2 liters/min.), the reactor is heated to operating temperature (320° C., 608° F.). Samples of the oil are withdrawn at half-hour intervals and analyzed for sulfur content. Analysis of this sulfur vs. time data gives a rate constant, which is a measure of the rate of the hydrodesulfurization reaction (for that particular catalyst and oil and those conditions of temperature, pressure, etc.).

Similarly, Trickle Bed reactors are used for HDS Testing. These have the advantage that their method of operation is closer to that of an actual refinery unit. In this test, a fixed column of catalyst is used, and the oil "trickles" down through the column at some fixed flow rate. Hydrogen is also fed in with the oil at some constant flow rate and pressure. After steady state operation is reached, exit oil is analyzed for sulfur. This sulfur analysis, together with oil flow rate, etc. can be related to a rate constant for the HDS reaction.

In any such HDS test, one obtains an absolute measure of reaction rate (the rate constant). This rate, however, is peculiar to the test conditions (temperature, pressure, flow rate, etc.) under which it was determined. For this reason, it is more useful to convert to a relative reaction rate or relative activity. This is simply the ratio of the rate constant for the catalyst of interest to the rate constant (determined under the same conditions) for some standard catalyst. This ratio, the relative activity, does not change much with test conditions, even though individual rate constants may change considerably. The standard against which we have compared other catalyst activities is HDS-2A. This catalyst is an established commercial HDS catalyst available from American Cyanamid Company. Activities may be compared for equal weights of catalysts, to give the relative weight activity (RWA), or for equal volumes of catalyst to give the relative volume activity (RVA). The RVA is calculated from the RWA simply by multiplying it by the ratio of the catalyst density (compacted bulk density, or (CBD), to that of the standard. The extrudates tested have diameters of about 0.065 to 0.070 inches, with lengths of from about 0.1 to 0.5 inches. Beads tested have diameters of about 0.066 to 0.094 inches. The LOI and RI figures for the rehydratable alumina powders from which the beads or extrudates have been prepared are listed in the tables.

The following tables illustrate the comparative catalytic activity testing of solution impregnated rehydratable alumina HDS catalysts:

TABLE I

Catalytic Activity (BSTR)

| Alumina Base (from rehydratable alumina) | Catalyst Metal Composition $CoO_3/MoO_3/P$ | RWA | RVA |
|---|---|---|---|
| Standards | | | |
| HDS-2A | 3/15 | 100 | 100 |
| beads 6.8 LOI | 2.5/8/.5 | 116 | 151 |
| 56 RI | 4/12/.75 | 97 | 130 |
|  | 5/16/1 | 95 | 132 |
| beads 7.3 LOI | 2.5/8/.5 | 95 | 124 |
| 50 RI | 4/12/.75 | 96 | 129 |
| extrudates | 2.5/8/.5 | 116 | 137 |
| from $HNO_3$ rehydration procedure of Example 1 | 2.5/8/.5 | 114 | 147 |
| 50 RI | 2.5/8/.5 | 112 | 148 |
| 6.6 LOI | | | |
|  | 3/9/.6 | 112 | 152 |
|  | 4/12/.8 | 116 | 151 |
| extrudates | 2.5/8/.5 | 114 | 135 |
| from HNO3 rehydration procedure of Example 2 | 4/8/.8 | 110 | 130 |
| 51 RI | 4/12/.8 | 105 | 131 |
| 7.2 LOI | | | |
|  | 4/8 | 112 | 130 |
|  | 4/12 | 101 | 119 |
| beads 9.0 LOI | 2.5/8/.5 | 86 | 103 |
| 49 RI | | | |
| beads 6.8 LOI | 2.5/8/.5 | 102 | 129 |
| 56 RI | 4/12/.75 | 93 | 120 |
|  | 5/16/1 | 99 | 140 |
| extrudates from | 2.5/8/.5 | 105 | 127 |
| $HNO_3$ rehydration |  | 110 | 133 |
| 56 RI | | | |
| 6.8 LOI | | | |
| beads 7.3 LOI | 2.5/8/.5 | 98 | 95 |
| 50 RI | 4/12/.75 | 87 | 90 |
| beads 6.6 LOI | 2.5/8/.5 | 100 | 88 |
| 50 RI | 2.5/8/.5 | 93 | 86 |

We claim:

1. A method of preparing hydrotreating catalysts for catalytic hydrodesulfurization of petroleum, having activated alumina supports, comprising:
   preparing a partially dehydrated, rehydratable alumina by flash calcining Bayer process hydrated alumina;
   rehydrating said partially dehydrated alumina with water which contains acid at pH below 7 at rehydration temperature, for the time needed for rehydration;
   solidifying the rehydrated alumina;
   mulling the solidified rehydrated alumina with sufficient water to make a mulled mixture suitable for particle forming; forming particles of desired size and configuration from the mulled mixture;
   drying the formed alumina particles and then calcining same by heating to calcining temperature;
   impregnating the calcined particles with liquid solutions of soluble compounds which are thermally decomposable to oxides of cobalt or nickel and to oxides of molybdenum or tungsten; and
   activating the impregnated alumina particles by calcining heat treatment to form hydrotreating catalysts.

2. The method of claim 1 including a washing step to remove soda impurities from the alumina.

3. The method of claim 2 wherein said forming comprises extruding an aqueous mix of the rehydratable alumina composition.

4. The method of claim 2 wherein said catalyst support particles are formed in the shape of beads.

5. A hydrotreating catalyst prepared according to the method of claim 1.

6. A hydrotreating catalyst prepared according to the method of claim 3.

7. A hydrotreating catalyst prepared according to the method of claim 4.

8. A hydrotreating catalyst prepared according to the method of claim 2.

9. The hydrotreating catalyst prepared according to the method of claim 1 wherein the promoters in the calcined hydrotreating catalyst consist of 2–6% by wt of the catalyst of a member selected from CoO and NiO and 6–24% by wt of the catalyst of a member selected from $MoO_3$ and $WO_3$.

10. The method of claim 2 including a curing step to harden the molded catalyst support forms.

11. The method of claim 10 wherein said curing step is a stream treatment step.

12. A hydrotreating catalyst prepared according to the method of claim 10.

* * * * *